(12) United States Patent
Martinez Perez et al.

(10) Patent No.: US 11,271,473 B2
(45) Date of Patent: Mar. 8, 2022

(54) ON-BOARD CHARGER (OBC) HAVING GRID FREQUENCY REJECTER

(71) Applicant: Lear Corporation, Southfield, MI (US)

(72) Inventors: Antonio Martinez Perez, Valls (ES); Adria Marcos Pastor, Valls (ES); Antonio Leon Masich, Valls (ES); Roberto Giral Castillon, Tarragona (ES); Javier Calvente Calvo, Tarragona (ES); Enric Vidal Idiarte, Tarragona (ES); Hugo Valderrama Blavi, Tarragona (ES)

(73) Assignee: Lear Corporation, Southfield, MI (US)

( * ) Notice: Subject to any disclaimer, the term of this patent is extended or adjusted under 35 U.S.C. 154(b) by 323 days.

(21) Appl. No.: 16/522,766

(22) Filed: Jul. 26, 2019

(65) Prior Publication Data

US 2021/0028691 A1   Jan. 28, 2021

(51) Int. Cl.
| | |
|---|---|
| *H02M 1/42* | (2007.01) |
| *H02M 3/155* | (2006.01) |
| *B60L 53/00* | (2019.01) |
| *H02M 1/14* | (2006.01) |

(52) U.S. Cl.
CPC ........... *H02M 1/4208* (2013.01); *B60L 53/00* (2019.02); *H02M 1/14* (2013.01); *H02M 3/155* (2013.01); *H02J 2207/40* (2020.01)

(58) Field of Classification Search
None
See application file for complete search history.

(56) References Cited

U.S. PATENT DOCUMENTS

| | | |
|---|---|---|
| 4,400,660 A | 8/1983 | Schaefer |
| 7,518,886 B1 | 4/2009 | Lai et al. |
| 8,711,585 B2 | 4/2014 | Liu et al. |
| 9,036,382 B2 | 5/2015 | Li et al. |
| (Continued) | | |

FOREIGN PATENT DOCUMENTS

| | | |
|---|---|---|
| DE | 9410995 U1 | 8/1995 |
| DE | 102017000065 A1 | 4/2019 |

OTHER PUBLICATIONS

German Patent and Trademark Office, German Office Action for corresponding German Patent Application No. DE 10 2020 209 079.3 dated Jan. 17, 2022.

*Primary Examiner* — Jared Fureman
*Assistant Examiner* — Aqeel H Bukhari
(74) *Attorney, Agent, or Firm* — Brooks Kushman P.C.

(57) ABSTRACT

An on-board charger (OBC) for using AC power to charge a traction battery of an electric vehicle includes a DC/DC converter and a controller. The converter receives input power including a voltage having a DC voltage component and a voltage ripple varying at a frequency of the AC power. The controller generates a control signal for controlling the converter to convert the input power into an output power having a current for charging the battery. The controller includes a filter which enhances a sensed value of the current at the frequency to generate a locally-enhanced sensed value of the current. The controller determines a difference between a target and the locally-enhanced sensed value of the current and generates the control signal based on the difference such that the converter in converting the input power into the output power in response to the control signal adapts the current to the target.

20 Claims, 4 Drawing Sheets

(56) References Cited

U.S. PATENT DOCUMENTS

| | | |
|---|---|---|
| 9,071,141 B2 | 6/2015 | Dong et al. |
| 10,218,260 B1 | 2/2019 | Jang et al. |
| 2007/0076450 A1 | 4/2007 | Kumar et al. |
| 2016/0105056 A1 | 4/2016 | Namurdri et al. |
| 2017/0106756 A1* | 4/2017 | Xu ........................ H02M 3/158 |
| 2017/0144555 A1 | 5/2017 | Chun et al. |
| 2017/0166064 A1* | 6/2017 | Chen ....................... B60L 50/62 |
| 2019/0202300 A1* | 7/2019 | Pastor ..................... B60L 53/14 |

* cited by examiner

ON-BOARD CHARGER (OBC) HAVING GRID FREQUENCY REJECTER

TECHNICAL FIELD

The present invention relates to on-board chargers of electric vehicles.

BACKGROUND

An on-board charger (OBC) of an electric vehicle is used for charging a traction battery of the electric vehicle. The OBC converts AC electrical power received from the electrical grid into DC electrical power and provides the DC electrical power to the traction battery for charging.

SUMMARY

An on-board charger (OBC) for using AC power to charge a traction battery of an electric vehicle is provided. The OBC includes a DC/DC converter and a controller. The DC/DC converter is operable to receive an input power having an input voltage. The input voltage includes a DC voltage component and a voltage ripple varying at a frequency of the AC power. The controller is operable to generate a control signal for controlling the DC/DC converter to convert the input power into an output power having an output current for charging the traction battery. The controller includes a filter which enhances a sensed value of the output current at the frequency to generate a locally enhanced sensed value of the output current. The controller determines a difference between a target value and the locally enhanced sensed value of the output current and generates the control signal based on the difference such that the DC/DC converter in converting the input power into the output power in response to the control signal adapts the output current to the target value.

The OBC may further include a DC link capacitor charged with the AC power from an electrical grid to have the input voltage. In this case, the DC link capacitor and the DC/DC converter are connected for the DC/DC converter to receive the input power having the input voltage from the DC link capacitor.

The target value is a DC target value. The output current includes a DC current component corresponding to the DC target value and a current ripple varying at the frequency. The current ripple is smaller in magnitude than otherwise would be if the sensed value of the output current was not locally enhanced by the filter. In operation, the target value slowly changes to adapt to traction battery voltage status (energy flow) and provides the required charge-flow value. Ordinarily, a separate unit (normally a Battery Management System or the like) monitors the traction battery and sends the charging request to the OBC.

The filter may be an analog filter or a digital filter.

The controller may further include a proportional-integral-derivative (PID) controller to generate the control signal based on the difference between the target value and the locally enhanced sensed value of the output current.

The controller may further include a modulation controller configured to generate modulated signals based on the control signal. The modulated signals are used to control switches of the DC/DC converter for the DC/DC converter to be controlled according to the control signal.

The OBC may further include a current sensor configured to sense the output current to generate the sensed value of the output current.

A charger for charging a battery is also provided. The charger includes a power source, a DC/DC converter, and a controller. The power source is configured to provide an input power having an input voltage including a DC voltage component and a voltage ripple varying at a frequency. The controller is operable to generate a control signal for controlling the DC/DC converter to convert the input power from the power source into an output power. The controller includes a filter which enhances a sensed value of the output current at the frequency to generate a locally enhanced sensed value of the output current. The controller determines a difference between a target value and the locally enhanced sensed value of the output current and generates the control signal based on the difference such that the DC/DC converter in converting the input power into the output power in response to the control signal adapts the output current to the target value.

A method for operating an OBC configured to use AC power to charge a traction battery of an electric vehicle is also provided. The OBC includes a DC/DC converter operable to receive an input power having an input voltage. The input voltage includes a DC voltage component and a voltage ripple varying at a frequency of the AC power. The method includes generating a control signal for controlling the DC/DC converter to convert the input power into an output power having an output current for charging the traction battery. The method further includes filtering a sensed value of the output current to enhance the sensed value of the output current at the frequency to generate a locally enhanced sensed value of the output current. The method further includes determining a difference between a target value and the locally enhanced sensed value of the output current. The step of generating the control signal includes generating the control signal based on the difference such that the DC/DC converter in converting the input power into the output power in response to the control signal adapts the output current to the target value.

The OBC may further include a DC link capacitor charged with the AC power from an electrical grid to have the input voltage. In this case, the method further includes receiving by DC/DC converter the input power having the input voltage from the DC link capacitor.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

Figure 1:
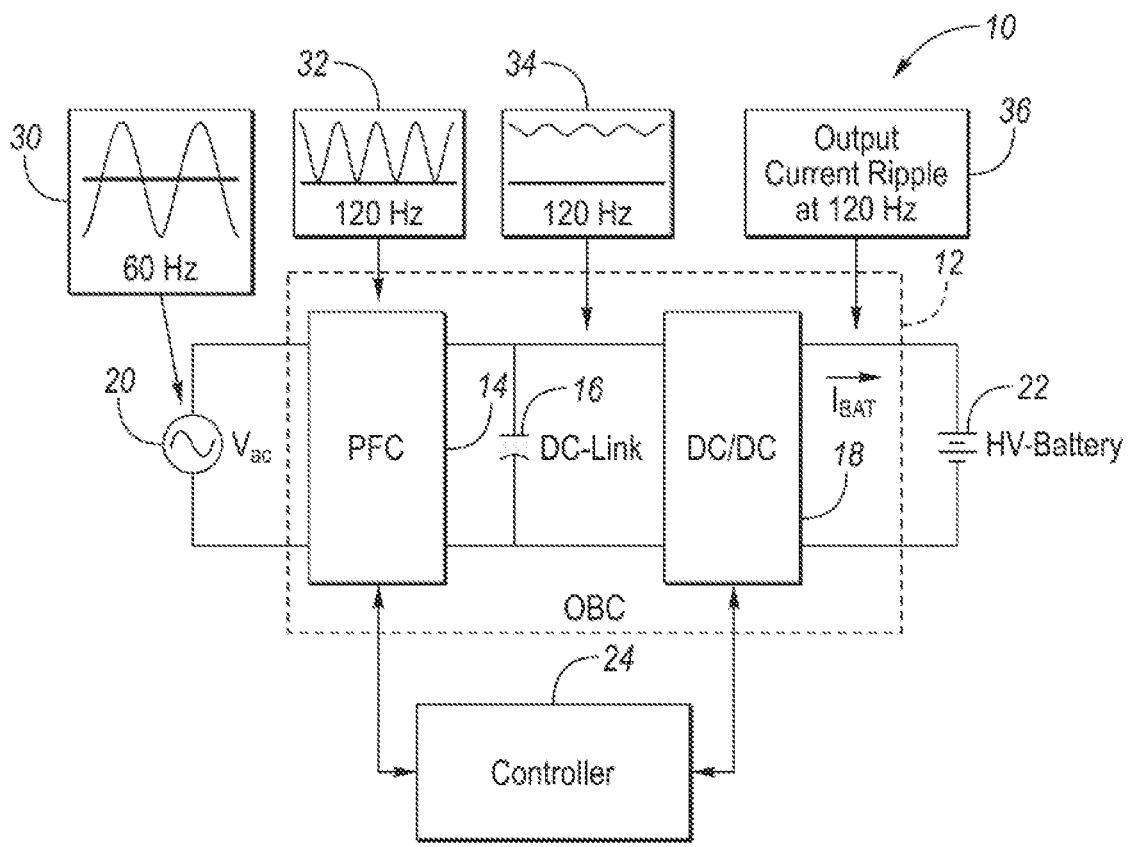
FIG. 1 illustrates a block diagram of an electrical system having an on-board charger (OBC) for charging a traction battery of an electric vehicle with electrical power from the electrical grid, the OBC having a power factor corrector (PFC), a DC link capacitor, and a DC/DC converter in this embodiment.

Referring now to FIG. 1, a block diagram of an electrical system 10 having an on-board charger (OBC) 12 in accordance with an embodiment is shown. OBC 12 is for use "on-board" an electric vehicle for charging a traction battery 22 of the electric vehicle. OBC 12 converts AC electrical power received from a mains supply 20 of the electrical grid into DC electrical power and provides the DC electrical power to traction battery 22 for charging. ("AC" stands for alternating current; and "DC" stands for direct current.)

Traction battery 22 is a high voltage ("HV") DC traction battery per electrical energy requirements for propulsion of the electric vehicle. The phrase "electric vehicle" herein encompasses any vehicle which uses electrical power from a traction battery for vehicle propulsion and encompasses battery-only electric vehicles (BEV), hybrid electric vehicles (HEV), plug-in hybrid electric vehicles (PHEV), and the like.

OBC 12 includes a power factor corrector (PFC) 14, a DC link capacitor 16, and a DC/DC converter 18. OBC 12 has an input which connects to mains supply 20 by an external Electric Vehicle Supply Equipment (EVSE) (not shown) to receive AC electrical power from the mains supply. OBC 12 has an output which connects to traction battery 22. OBC 12 converts AC electrical power from mains supply 20 into DC electrical power and provides the DC electrical power to traction battery 22 for charging. In this way, OBC 12 charges traction battery 22 using AC electrical energy from the electrical grid.

PFC 14, DC link capacitor 16, and DC/DC converter 18 are cascaded stages of OBC 12. PFC 14 converts AC electrical power from mains supply 20 into DC electrical power plus AC electrical power and delivers the DC electrical power plus AC electrical power to DC link capacitor 16 and DC/DC converter 18 while keeping the power factor close to unity. PFC 14 is controlled so that the voltage of DC link capacitor 16 is regulated at a desired DC voltage level. The voltage of DC link capacitor 16 is the input voltage to DC/DC converter 18. DC/DC converter 18 converts the input voltage from DC link capacitor 16 to a higher/lower DC voltage level according to the charge requirement/status of traction battery 22. This DC voltage level is the output voltage of DC/DC converter 18. Traction battery 22 is charged with the output current of DC/DC converter 18.

As described, PFC 14 is the grid front-end and DC/DC converter 18 adapts output to the voltage range of traction battery 22. Particularly, PFC 14 is used to control the electrical current absorbed from mains supply 20 and to control the voltage of DC link capacitor 16. DC/DC converter 18 regulates the charging output current delivered to traction battery 22 from the DC link and PFC stages.

A controller 24 is associated with OBC 12. Controller 24 is an electronic device such as a processor, micro-controller, or the like (e.g., a computer). Controller 24 is in communication with PFC 14 and DC/DC converter 18 to control operations of the PFC and the DC/DC converter. For instance, controller 24 controls PFC 14 in converting AC electrical power from mains supply 20 into DC electrical power plus AC electrical power and delivering the DC electrical power plus AC electrical power to DC link capacitor 16 and DC/DC converter 18. In this regard, controller 24 appropriately controls the switching and switching duration of power transistor switches (not shown) of PFC 14 to control the power factor correction provided by the PFC and the operation of the PFC in delivering a selected amount of DC electrical power plus AC electrical power, converted from AC electrical power of mains supply 20, to DC link capacitor 16. In this way, DC link capacitor 16 is regulated at the desired DC voltage level.

More accurately, controller 24 controls PFC 14 to deliver a selected amount of AC and DC electrical power to DC link capacitor 16. DC link capacitor 16 is responsible to filter the AC electrical power while DC/DC converter 18 absorbs the DC electrical power and transfers it to traction battery 22. The voltage of DC link capacitor 16 is kept regulated properly as long as PFC 14 provides the same amount of DC electrical power that DC/DC converter 18 absorbs and delivers to traction battery 22.

Controller 24 controls DC/DC converter 18 in converting the DC input voltage from DC link capacitor 16 to a higher/lower DC output voltage for charging traction battery 22. In this regard, controller 24 appropriately controls the switching and switching duration of power transistor switches (not shown) of DC/DC converter 18 for the DC/DC converter to convert the input voltage from DC link capacitor 16 into a higher/lower output voltage. Controller 24 is also operable to communicate and control other nodes of electrical system 10 and the vehicle including nodes involved in the charging applications.

DC link capacitor 16 is one or more bulk capacitors which collectively comprise the DC link capacitor.

Mains supply 20 may be a single, dual, or three-phase mains supply. As such, AC mains voltage may be a single, dual, or three-phase AC mains voltage. For simplicity, mains supply 20 is assumed to be a single-phase mains supply. OBC 12 is thus described herein as having a single set of PFC 14, DC link capacitor 16, and DC/DC converter 18. In the case of AC mains voltage being a dual-phase (three-phase) AC mains voltage, OBC 12 would include two (three) sets of PFC 14, DC link capacitor 16, and DC/DC converter 18, respectively, for the two (three) phases.

Ideally in a three-phase supply with all phases balanced there would not be any low frequency present on a DC link capacitor that receives power from a three-phase PFC. Of course, in the real domain, any AC grid unbalance will generate distortion and voltage ripple at the DC link capacitor. If the internal structure of the OBC is based on a single-phase module, although the mains is a three-phase type of grid, the situation is the same as having three separated single-phase OBCs. However, due to the natural phase-shift of 120° between phases, that low-frequency harmonic at the output current would be naturally compensated.

In steady-state operation (e.g., a stable operation mode) of OBC 12, the voltage of DC link capacitor 16 is boosted and regulated at a certain DC voltage level and traction battery 22 is charged with DC electrical power from the DC link capacitor via DC/DC converter 18.

As further shown in FIG. 1, the waveform of the AC electrical power from mains supply 20 is a sine wave having a frequency of 60 Hz, as indicated in block 30. (The 60 Hz frequency is the standard for the electrical grid in certain countries. In other countries 50 Hz frequency is the standard for the electrical grid.) PFC 14 full-wave rectifies the received AC electrical power from mains supply 20. The PFC rectified output varies at twice the mains supply frequency. As such, the PFC rectified output varies at 120 Hz, as indicated in block 32. (The PFC rectified output varies at 100 Hz for the mains supply frequency of 50 Hz.)

Although DC link capacitor 16 acts as an intermediate energy storage and filter (stabilizer), the DC link voltage of the DC link capacitor has a voltage ripple. Particularly, the DC link voltage of DC link capacitor 16 has (i) a DC voltage component and (ii) a voltage ripple which varies at 120 Hz, as indicated in block 34. The magnitude of the voltage ripple of the DC link voltage is relatively small compared to the magnitude of the DC voltage component of the DC link voltage at steady state operation of OBC 12. The voltage ripple of the DC link voltage varies at 120 Hz in conjunction with the 120 Hz varied PFC rectified output received by DC link capacitor 16. (The voltage ripple of the DC link voltage varies at 100 Hz in conjunction with the PFC rectified output varying at 100 Hz when the mains supply frequency is 50 Hz.)

As described, DC/DC converter 18 adjusts the output current (labeled "$I_{Bat}$" in FIG. 1) outputted from the DC/DC converter to traction battery 22 according to the demand/status of the traction battery. The output current has a (i) a DC current component and (ii) a current ripple, as indicated in block 36. The magnitude of the current ripple is relatively small compared to the magnitude of the DC current component at steady state operation of OBC 12, as further indicated in block 36. The current ripple varies at 120 Hz, as further indicated in block 36. The current ripple varies at 120 Hz in conjunction with the 120 Hz varied voltage ripple of the DC link voltage received by DC/DC converter 18 from DC link capacitor 16. (The current ripple varies at 100 Hz in conjunction with the voltage ripple of the DC link voltage varying at 100 Hz when the mains supply frequency is 50 Hz.)

The current ripple may include other current ripple components (harmonics) due to imperfections of the various elements in the system including the AC input supply. As such, the current ripple "mainly" varies at 120 Hz (or 100 Hz) as the 120 Hz (or 100 Hz) current ripple component is the largest current ripple component of the current ripple.

The current ripple of the output current may cause traction battery 22 to overheat thereby reducing the system life of the traction battery. Consequently, a maximum value for the magnitude of the current ripple may be imposed.

The magnitude of the current ripple can be decreased by making DC link capacitor 16 physically larger. However, as OBC 12 is on-board an electric vehicle, it desired to reduce the total volume, weight, and cost of the OBC. Commonly, the total volume, weight, and cost of OBC 12 is reduced by making DC link capacitor 16 physically smaller, thus compromising the 120 Hz ripple filtering dependent on the physical size of the DC link capacitor.

DC/DC converter 18 is part of a gain control loop having a DC/DC controller. The DC/DC controller is designed to control DC/DC converter 18 to adjust the output current to a target value according to the demand/status of traction battery 22. The DC/DC controller provides some ripple filtering. However, to be stable, the DC/DC controller is limited in the gain (at the low-pass frequency band encompassing 120 Hz) and the ripple filtering provided by the DC/DC controller may not be enough for the increased 120 Hz ripple.

Figure 2:
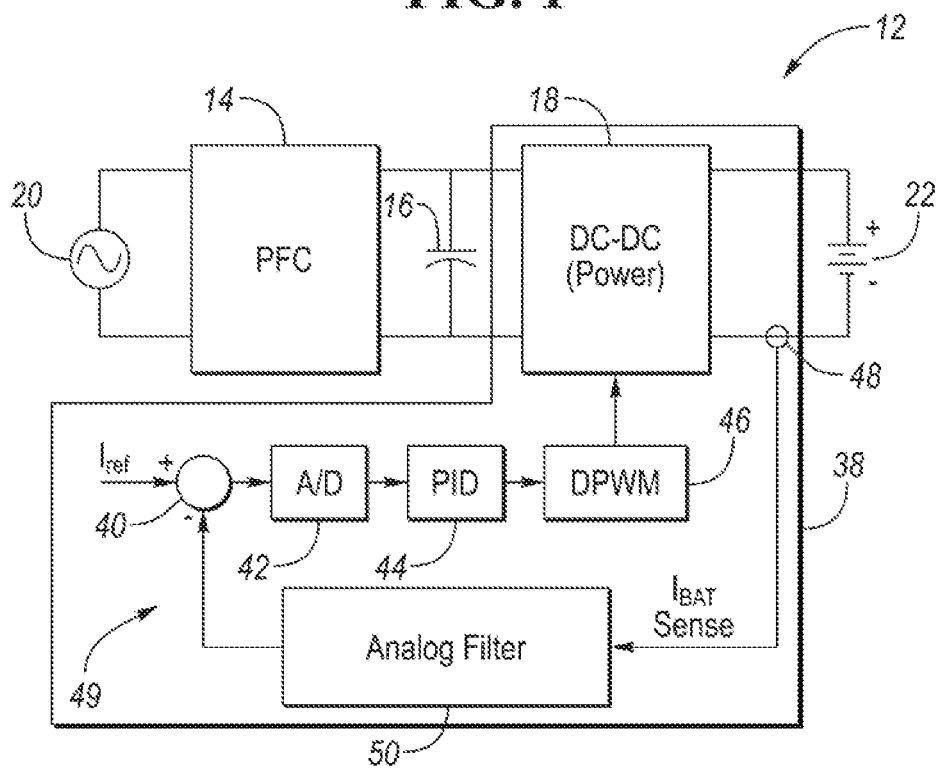
FIG. 2 illustrates a more detailed block diagram of the OBC including a gain control loop having the DC/DC converter and a DC/DC controller, the DC/DC controller for controlling the DC/DC converter and having a filter for use in improving electrical grid frequency rejection in the controlling of the DC/DC converter.

Referring now to FIG. 2, with continual reference to FIG. 1, a more detailed block diagram of OBC 12 is shown. The block diagram of OBC 12 is more detailed in that a gain control loop 38 is shown in FIG. 2. Gain control loop 38 includes DC/DC converter 18 and a DC/DC controller 49 for controlling DC/DC converter 18. DC/DC controller 49 is implemented by controller 24 but may be a separate controller associated only with DC/DC converter 18.

DC/DC controller 49 controls DC/DC converter 18 to adjust the output current ($I_{Bat}$) to a target value ($I_{ref}$) for the output current. The target value for the output current is indicative of an output current having a DC current component and no current ripple. The magnitude of this DC current component is the target value.

In general, DC/DC controller 49 receives the target value ($I_{ref}$) for the output current and a sensed value ($I_{Bat\_sense}$) of the output current, determines an error signal indicative of the difference between the target and sensed output current values, generates a control signal as a function of the error signal, and controls the power transistor switches of DC/DC converter 18 according to the control signal to cause the DC/DC converter to output an output current that can be made as close as possible by OBC 12 to the target value. DC/DC controller 49 thus functions to minimize the difference between (i) the output current and (ii) the target value for the output current.

DC/DC controller 49 includes a subtractor 40, an analog-to-digital converter (ADC) 42, a PID (proportional-integral-derivative) controller 44, and a pulse width modulation (PWM) controller 46. PWM controller 46 may be a digital PWM controller (DWPM) as shown in FIG. 2. Although PWM based controllers typically work with constant frequency and variable duty cycle, in this embodiment PWM controller 46 is based on a variable switching frequency but constant duty cycle.

Gain control loop 38 further includes a current sensor 48 for sensing the output current ($I_{Bat}$) of DC/DC converter 18.

In operation, subtractor 40 receives the target value ($I_{ref}$) for the output current to be outputted by DC/DC converter 18. For instance, the target value for the output current is generated by controller 24 based on the charging demand/status of traction battery 22. Subtractor 40 receives from current sensor 48 the sensed value of the output current being outputted from DC/DC converter 18. Subtractor 40 generates an error signal indicative of the difference between the target value for the output current and the sensed value of the output current. The error signal is an analog signal.

ADC 42 receives the error signal from subtractor 40. ADC 42 converts the analog error signal into a digital error signal and provides same to PID controller 44. PID controller 44 generates a control signal as a function of the error signal. The control signal generated by PID controller 44 is a correction which attempts to minimize the error signal over time by adjustment of the switching of the power transistor switches of DC/DC converter 18 (i.e., the control signal is a correction which attempts to cause DC/DC converter 18 to be controlled such that the difference between the output current and the target value for the output current is minimized over time). PWM controller 46 receives the control signal from PID controller 44. PWM controller 46 controls the power switches of DC/DC converter 18 in accordance with the control signal. The process is continued over time such that DC/DC controller 49 causes the output current outputted from DC/DC converter 18 to become and stay as close as possible, depending on the capabilities of OBC 12, to the target value.

As described above, with gain control loop 38 not having DC/DC controller 49, the output current outputted from DC/DC converter 18 has a current ripple. The current ripple mainly varies at twice the frequency of the electrical grid (i.e., the current ripple mainly varies at 120 Hz with 60 Hz mains supply). The current ripple is ripple present in the DC charging output of DC/DC converter 18. Particularly, the current ripple represents electrical grid frequency noise in the DC charging output of DC/DC converter 18. Such electrical grid frequency noise in the DC charging output of DC/DC converter 18 causes traction battery 22 to overheat depending on the current ripple magnitude. As such, typically a current ripple threshold is defined at which overheating is affecting traction battery 22 and should be reduced.

To be stable, DC/DC controller 49 of gain control loop 38, as described so far with reference to FIG. 2, is limited in gain at a low-pass frequency band encompassing 100-120 Hz. Consequently, the ripple filtering provided by DC/DC controller 49, as described so far with reference to FIG. 2, may not be enough for the existing 120 Hz (or 100 Hz) current ripple. Thus, the output current outputted from DC/DC converter 18 may still have an undesired amount of the current ripple.

In accordance with the present disclosure, DC/DC controller 49 of gain control loop 38 further includes a filter 50. Filter 50 enables DC/DC controller 49 to further reduce the current ripple of the output current outputted from DC/DC converter 18. The output current is thereby caused by DC/DC controller 49 to match more closely the target value for the output current.

As shown in FIG. 2, filter 50, which may be an analog filter or a digital filter, is interposed between subtractor 40 and current sensor 48. As such, filter 50, instead of subtractor 40, receives from current sensor 48 the sensed value of the output current being outputted from DC/DC converter 18. Filter 50 is configured to locally enhance the 120 Hz (or 100 Hz) current ripple of the output current, at the sensing feedback from current sensor 48. Filter 50 has filter parameters which are selected so that the total gain is only affected at the relevant 100 Hz frequency, 120 Hz frequency, or 100-120 Hz frequency band. That is, filter 50 has a band of frequencies where the energy is amplified, while the rest of frequencies is left "as is" (gain=1). Filter 50 thus generates a filtered version of the sensed value of the output current in which the 120 Hz (or 100 Hz) component of the sensed value of the output current is relatively enhanced.

Filter 50 provides the filtered version of the sensed value of the output current to subtractor 40. Subtractor 40 generates the error signal indicative of the difference between the target value for the output current and the filtered version of the sensed value of the output current. As the filtered version of the sensed value of the output current includes an enhanced value of the current ripple, the error signal includes an enhanced component indicative of the current ripple. PID controller 44 thus takes the current ripple into relatively greater account when generating the control signal based on the error signal. Consequently, the control signal is a more accurate correction for reducing the current ripple. PWM controller 46 controls DC/DC converter 18 in accordance with the control signal as described above with the result being that the output current has a relatively reduced amount of current ripple. The output current thus more closely resembles the target value for the output current (i.e., the output current has (i) a DC current component, which matches the DC current component of the target value for the output current, and (ii) little or no current ripple).

In this way, DC/DC controller 49 with filter 50 more easily detects the current ripple of the output current and better reacts to eliminating the current ripple. Thus, with the use of DC/DC controller 49 having filter 50, the output current has relatively little or no current ripple. Filter 50 is provided in DC/DC controller 49 to minimize the electrical grid frequency noise in the DC charging output of OBC 12. DC/DC controller 49 having filter 50 thus improves electrical grid frequency rejection of OBC 12. Such electrical grid frequency filtering at the DC/DC converter stage in an OBC optimizes the requirements for the DC link capacitor (e.g., a physically smaller, and thereby cheaper, DC link capacitor can be used).

Figures 3A, 3B:
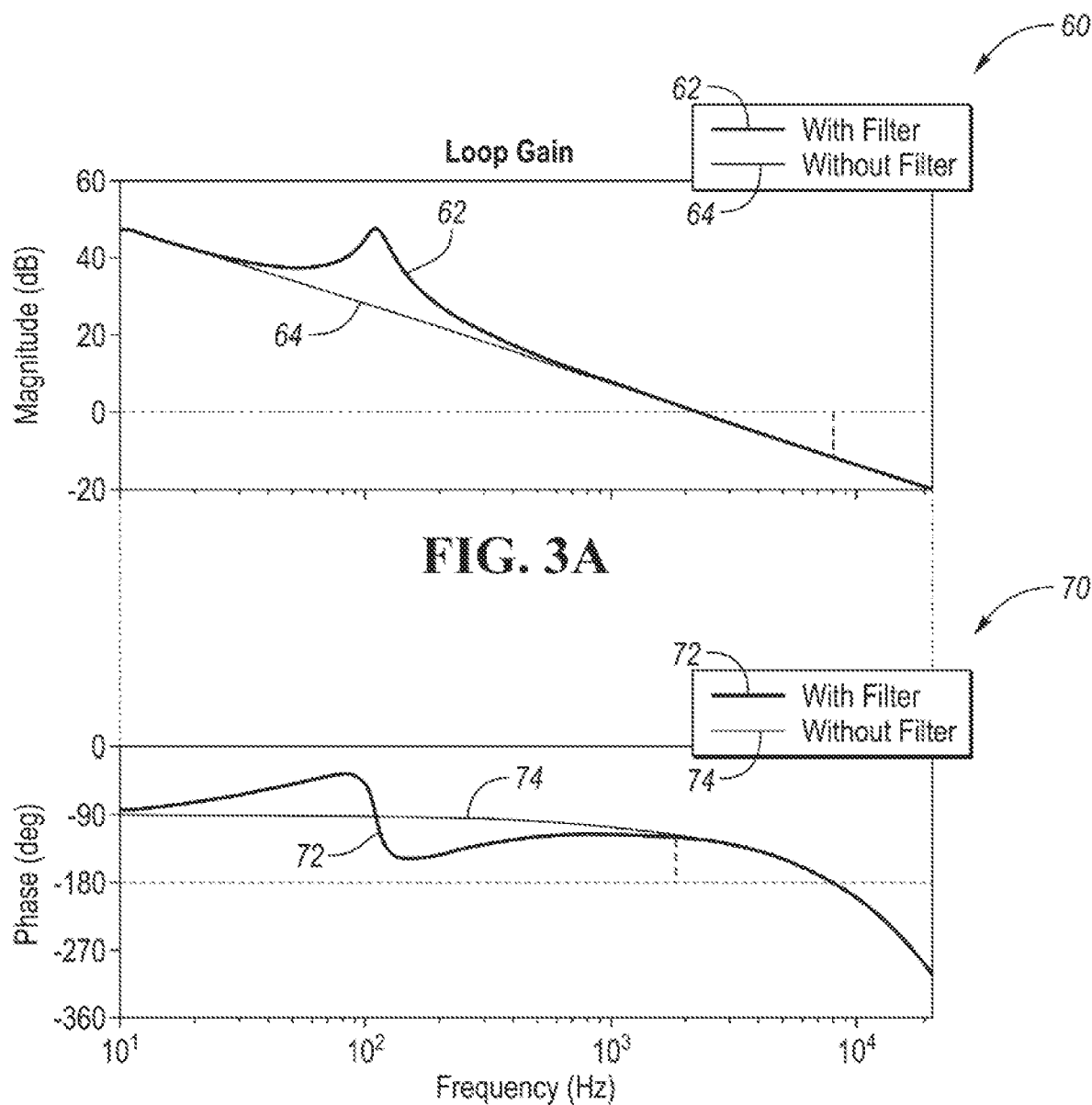
FIG. 3A illustrates a graph including a first plot of magnitude vs. frequency behavior depicting a loop error compensation function provided by the DC/DC controller in the controlling of the DC/DC converter when the DC/DC controller has the filter and illustrates a second plot of magnitude vs. frequency behavior provided by the DC/DC controller in the controlling of the DC/DC converter when the DC/DC controller does not have the filter.
FIG. 3B illustrates a graph including a first plot of phase vs. frequency behavior depicting the loop error compensation function provided by the DC/DC controller in the controlling of the DC/DC converter when the DC/DC controller has the filter and illustrates a second plot of phase vs. frequency behavior provided by the DC/DC controller in the controlling of the DC/DC converter when the DC/DC controller does not have the filter.

FIG. 3A illustrates a graph 60 including a first plot 62 of magnitude vs. frequency behavior depicting a loop error compensation function provided by DC/DC controller 49 in the controlling of DC/DC converter 18 when the DC/DC controller has filter 50. FIG. 3A further illustrates a second plot 64 of magnitude vs. frequency behavior provided by DC/DC controller 49 in the controlling of DC/DC converter 18 when the DC/DC controller does not have filter 50.

Initially, plots 62 and 64 indicate that the sensed value of the DC current component (i.e., at 0 Hz) of the output current, with or without the presence of filter 50, passes to subtractor 40 for comparison with the target value. However, plot 62 further indicates that the sensed value of the current ripple (i.e., at 120 Hz or 100 Hz) is relatively enhanced with the presence of filter 50. In contrast, without the presence of filter 50, the sensed value of the current ripple (i.e., at 120 Hz or 100 Hz) is not relatively enhanced as indicated by plot 64. Thus, FIG. 3A shows a band enhancement done by filter 50 (which may be analog or digital as described herein), that then is subtracted from the reference signal. This means that, in the end, this band of frequencies is diminished (the error difference is increased so that PID controller 44 reacts to minimize it).

For further reference, FIG. 3B illustrates a graph 70 including a first plot 72 of phase vs. frequency behavior depicting the loop error compensation function provided by DC/DC controller 49 in the controlling of DC/DC converter 18 when the DC/DC controller has filter 50. FIG. 3B further illustrates a second plot 74 of phase vs. frequency behavior provided by DC/DC controller 49 in the controlling of DC/DC converter 18 when the DC/DC controller does not have filter 50.

Filter 50 may be a passive electronics filter made up of passive electrical components, such as inductors and capacitors. Alternatively, filter 50 may be an active electronics filter made up of active electrical components such as amplifiers.

As described herein, OBC 12 has an improved 100-120 Hz band rejection by filter 50 being implemented as part of DC/DC controller 49 of gain control loop 38. Filter 50 may be designed to provide 100-120 Hz band rejection, 100 Hz rejection, or 120 Hz rejection.

OBC 12 is usable for all types of electric vehicles including HEVs, PHEVs, and EVs. OBC 12 can also be used for other high-power applications.

OBC 12 in accordance with the embodiment shown in FIGS. 1 and 2 and described herein has DC link capacitor 16. In other embodiments, OBC 12 does not have DC link capacitor 16. In these other embodiments, DC/DC converter 18 receives an input power signal having the input voltage from some other power source.

Referring now to FIGS. 4A, 4B, 4C, and 4D, block diagrams of respective variations of gain control loop 38 in accordance with different embodiments are respectively shown.

Figure 4A:
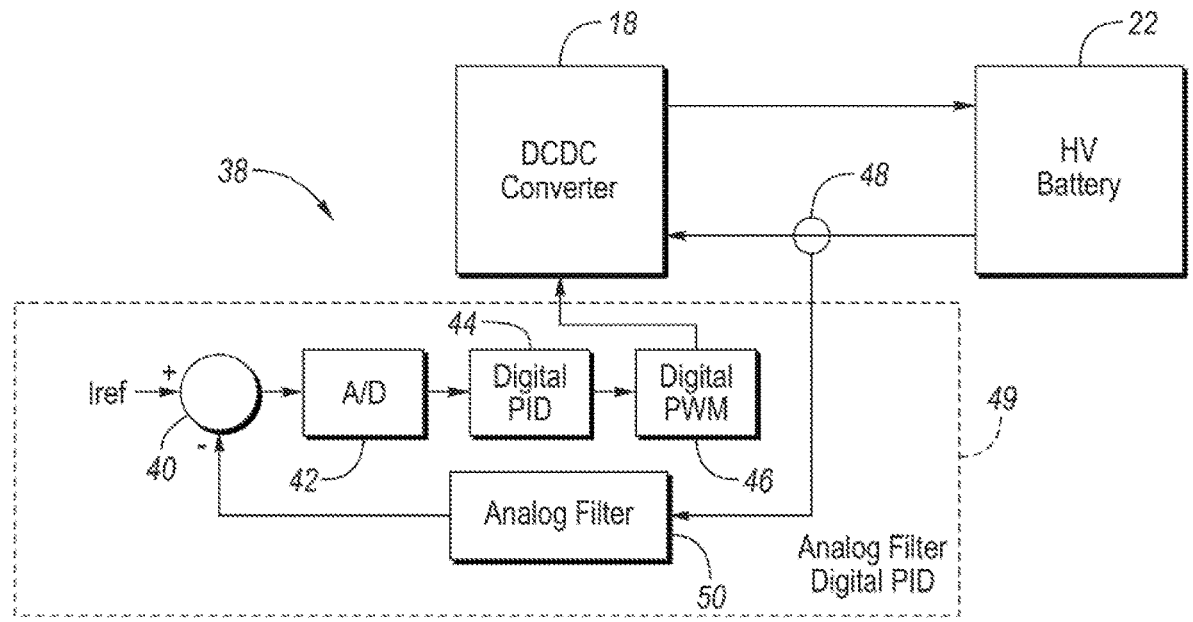
FIGS. 4A, 4B, 4C, and 4D illustrate block diagrams of respective variations of the gain control loop in accordance with different embodiments.

FIG. 4A illustrates gain control loop 38 in accordance with a first variation. In this first variation, DC/DC controller 49 of gain control loop 38 includes subtractor 40, ADC 42, PID controller 44, PWM controller 46, and filter 50. The components of DC/DC controller 49 are arranged as shown in FIG. 4A in the same arrangement as shown in FIG. 2. In this first variation, filter 50 is an analog filter, PID controller 44 is a digital PID controller, and PWM controller 46 is a digital PWM controller. As such, in this first variation, gain control loop 38 is a gain control loop with analog filter and digital PID.

Figure 4B:
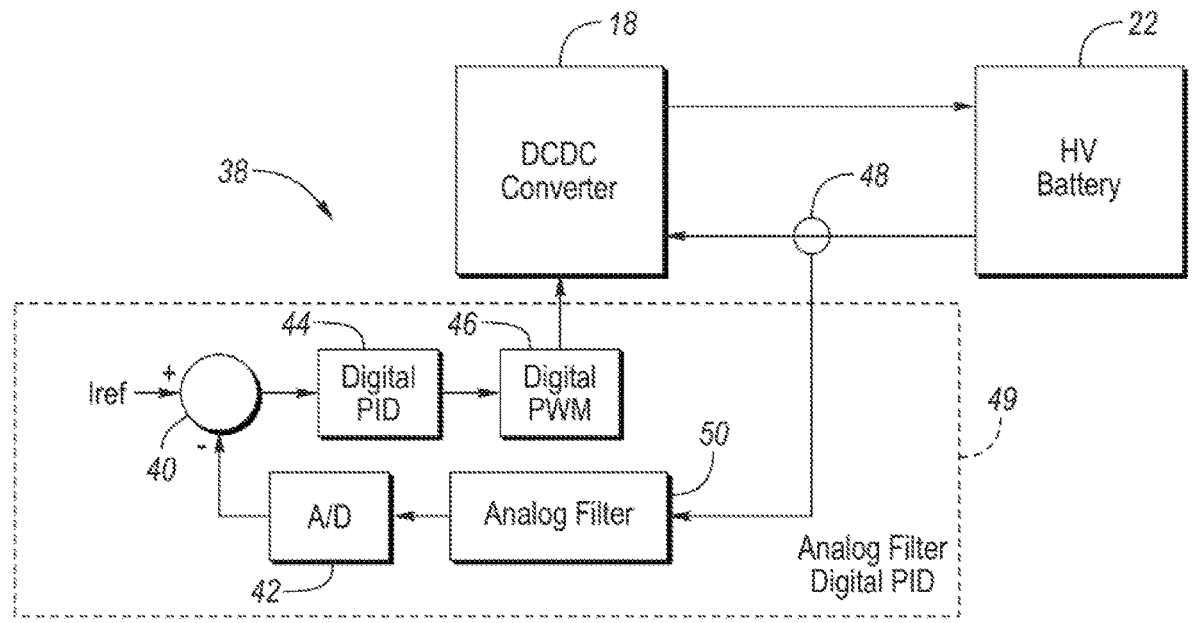

FIG. 4B illustrates gain control loop 38 in accordance with a second variation. In this second variation, DC/DC controller 49 of gain control loop 38 includes subtractor 40, ADC 42, PID controller 44, PWM controller 46, and filter 50. The components of DC/DC controller 49 are arranged as shown in FIG. 4B with ADC 42 being interposed between subtractor 40 and filter 50. In this second variation, filter 50 is an analog filter, PID controller 44 is a digital PID controller, and PWM controller 46 is a digital PWM controller. As such, in this second variation, gain control loop 38 is a gain control loop with analog filter digital subtraction and PID.

Figure 4C:
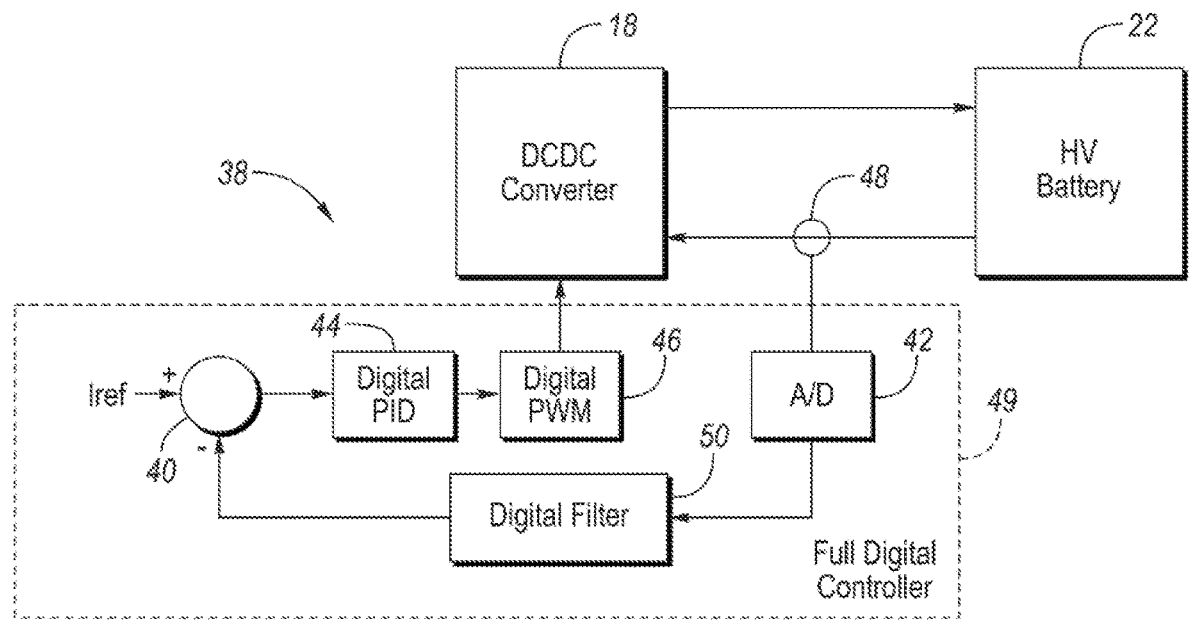

FIG. 4C illustrates gain control loop 38 in accordance with a third variation. In this third variation, DC/DC controller 49 of gain control loop 38 includes subtractor 40, ADC 42, PID controller 44, PWM controller 46, and filter 50. The components of DC/DC controller 49 are arranged as shown in FIG. 4C with ADC 42 being interposed between current sensor 48 and filter 50. In this third variation, filter 50 is a digital filter, PID controller 44 is a digital PID controller, and PWM controller 46 is a digital PWM controller. As such, in this third variation, gain control loop 38 is a gain control loop with all stages digital.

Figure 4D:
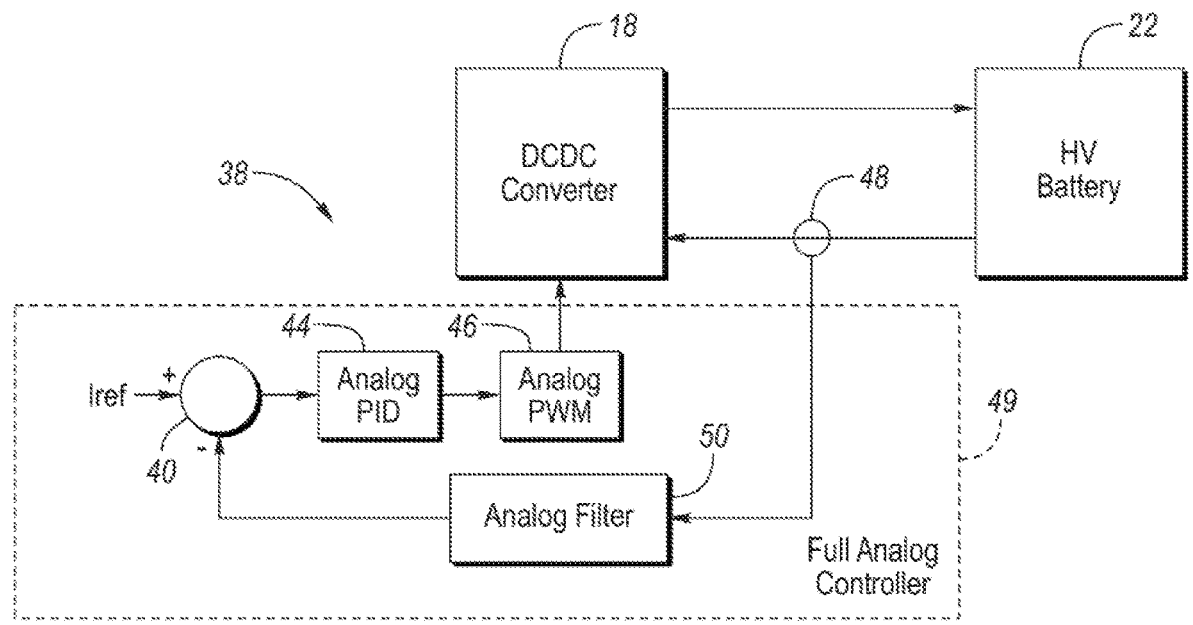

FIG. 4D illustrates gain control loop 38 in accordance with a fourth variation. In this fourth variation, DC/DC controller 49 of gain control loop 38 includes subtractor 40, PID controller 44, PWM controller 46, and filter 50, but does not include ADC 42. The components of DC/DC controller 49 are arranged as shown in FIG. 4D in the same arrangement as shown in FIG. 2 except that ADC 42 is absent. In this fourth variation, filter 50 is an analog filter, PID controller 44 is an analog PID controller, and PWM controller 46 is an analog PWM controller. As such, in this fourth variation, gain control loop 38 is a gain control loop with all stages analog.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An on-board charger (OBC) for using AC power to charge a traction battery of an electric vehicle, the OBC comprising:

a DC/DC converter operable to receive an input power having an input voltage, the input voltage including a DC voltage component and a voltage ripple varying at a frequency of the AC power; and a controller operable to generate a control signal for controlling the DC/DC converter to convert the input power into an output power having an output current for charging the traction battery, the controller including a filter which enhances a sensed value of the output current at the frequency to generate a locally enhanced sensed value of the output current, wherein the controller determines a difference between a target value and the locally enhanced sensed value of the output current and generates the control signal based on the difference such that the DC/DC converter in converting the input power into the output power in response to the control signal adapts the output current to the target value.

2. The OBC of claim 1 further comprising:

a DC link capacitor charged with the AC power from an electrical grid to have the input voltage, the DC link capacitor and the DC/DC converter are connected for the DC/DC converter to receive the input power having the input voltage from the DC link capacitor.

3. The OBC of claim 1 wherein:

the target value is a DC target value; and the output current includes a DC current component corresponding to the DC target value and a current ripple varying at the frequency, the current ripple being smaller in magnitude than otherwise would be if the sensed value of the output current was not locally enhanced by the filter.

4. The OBC of claim 1 wherein:

the filter is a digital filter or an analog filter.

5. The OBC of claim 1 wherein:

the controller further includes a proportional-integral-derivative (PID) controller to generate the control signal based on the difference between the target value and the locally enhanced sensed value of the output current.

6. The OBC of claim 1 wherein:

the controller further includes a modulation controller configured to generate modulated signals based on the control signal, the modulated signals being used to control switches of the DC/DC converter for the DC/DC converter to be controlled according to the control signal.

7. The OBC of claim 1 further comprising:

a current sensor configured to sense the output current to generate the sensed value of the output current.

8. A charger for charging a battery, comprising:

a power source for providing an input power having an input voltage including a DC voltage component and a voltage ripple varying at a frequency;

a DC/DC converter; and a controller operable to generate a control signal for controlling the DC/DC converter to convert the input power from the power source into an output power having an output current for charging the battery, the controller including a filter which enhances a sensed value of the output current at the frequency to generate a locally enhanced sensed value of the output current, wherein the controller determines a difference between a target value and the locally enhanced sensed value of the output current and generates the control signal based on the difference such that the DC/DC converter in converting the input power into the output power in response to the control signal adapts the output current to the target value.

9. The charger of claim 8 wherein:
the target value is a DC target value; and
the output current includes a DC current component corresponding to the DC target value and a current ripple varying at the frequency, the current ripple being smaller in magnitude than otherwise would be if the sensed value of the output current was not locally enhanced by the filter.

10. The charger of claim 8 wherein:
the controller further includes a proportional-integral-derivative (PID) controller to generate the control signal based on the difference between the target value and the locally enhanced sensed value of the output current.

11. The charger of claim 8 wherein:
the controller further includes a modulation controller configured to generate modulated signals based on the control signal, the modulated signals being used to control switches of the DC/DC converter for the DC/DC converter to be controlled according to the control signal.

12. The charger of claim 8 further comprising:
a current sensor configured to sense the output current to generate the sensed value of the output current.

13. The charger of claim 8 wherein:
the filter is a digital filter or an analog filter.

14. The charger of claim 8 wherein:
the power source is a DC link capacitor.

15. A method for operating an on-board charger (OBC) configured to use AC power to charge a traction battery of an electric vehicle, the OBC having a DC/DC converter operable to receive an input power having an input voltage, the input voltage including a DC voltage component and a voltage ripple varying at a frequency of the AC power, the method comprising:

generating a control signal for controlling the DC/DC converter to convert the input power into an output power having an output current for charging the traction battery;
filtering a sensed value of the output current to enhance the sensed value of the output current at the frequency to generate a locally enhanced sensed value of the output current;
determining a difference between a target value and the locally enhanced sensed value of the output current; and
wherein generating the control signal includes generating the control signal based on the difference such that the DC/DC converter in converting the input power into the output power in response to the control signal adapts the output current to the target value.

16. The method of claim 15 wherein the OBC further includes a DC link capacitor charged with the AC power from an electrical grid to have the input voltage, the method further comprising:
receiving by DC/DC converter the input power having the input voltage from the DC link capacitor.

17. The method of claim 15 wherein:
filtering the sensed value of the output current includes using an analog filter or a digital filter.

18. The method of claim 15 wherein:
generating the control signal includes using a proportional-integral-derivative (PID) controller.

19. The method of claim 15 further comprising:
sensing the output current using a current sensor to generate the sensed value of the output current.

20. The method of claim 15 wherein:
the target value is a DC target value; and
the output current includes a DC current component corresponding to the DC target value and a current ripple varying at the frequency, the current ripple being smaller in magnitude than otherwise would be if the sensed value of the output current was not enhanced at the frequency by the filtering.

\* \* \* \* \*